United States Patent
Liu et al.

(10) Patent No.: US 12,534,720 B2
(45) Date of Patent: Jan. 27, 2026

(54) METHODS FOR PREPARING 5'-END LIGATION-BASED ssDNA-SPECIFIC SEQUENCING LIBRARIES

(71) Applicant: INSTITUTE OF BASIC MEDICAL SCIENCES CHINESE ACADEMY OF MEDICAL SCIENCES, Beijing (CN)

(72) Inventors: Depei Liu, Beijing (CN); Yan Xie, Beijing (CN); Lanzhi Ma, Beijing (CN)

(73) Assignee: INSTITUTE OF BASIC MEDICAL SCIENCES CHINESE ACADEMY OF MEDICAL SCIENCES, Beijing (CN)

( * ) Notice: Subject to any disclaimer, the term of this patent is extended or adjusted under 35 U.S.C. 154(b) by 0 days.

(21) Appl. No.: 19/202,222

(22) Filed: May 8, 2025

(65) Prior Publication Data
US 2025/0270541 A1   Aug. 28, 2025

Related U.S. Application Data

(63) Continuation-in-part of application No. PCT/CN2024/123892, filed on Oct. 10, 2024.

(30) Foreign Application Priority Data

Feb. 6, 2024   (CN) .......................... 202410166121.7

(51) Int. Cl.
C12N 15/10   (2006.01)
C12Q 1/6855  (2018.01)

(52) U.S. Cl.
CPC ....... *C12N 15/1093* (2013.01); *C12Q 1/6855* (2013.01)

(58) Field of Classification Search
None
See application file for complete search history.

(56) References Cited

U.S. PATENT DOCUMENTS

| 2020/0115736 A1 | 4/2020 | Fu et al. |
| 2023/0416803 A1 | 12/2023 | Slatter |

FOREIGN PATENT DOCUMENTS

| CN | 101619335 A | 1/2010 | |
| CN | 104388426 A | 3/2015 | |
| CN | 109536579 A | 3/2019 | |
| CN | 109797197 A | 5/2019 | |
| CN | 112410331 A | 2/2021 | |
| CN | 115197998 A | 10/2022 | |
| CN | 115928222 A | 4/2023 | |
| CN | 116200478 A | 6/2023 | |
| CN | 117701679 A | 3/2024 | |
| WO | WO-2017174572 A1 * | 10/2017 | .......... C12Q 1/6806 |
| WO | 2019114146 A1 | 6/2019 | |
| WO | 2022256560 A1 | 12/2022 | |
| WO | 2023046163 A1 | 3/2023 | |

OTHER PUBLICATIONS

Smith, C. "Optimizing NGS Library Prep", Biocompare, Editorial Articles, pp. 1-4, published Jul. 22, 2021 (Year: 2021).*
Second Office Action in Chinese Application No. 202410166121.7 mailed on Apr. 8, 2024, 25 pages.
Decision to Grant a Patent in Chinese Application No. 202410166121.7 mailed on Apr. 30, 2024, 5 pages.
First Office Action in Chinese Application No. 202410166121.7 mailed on Mar. 18, 2024, 22 pages.
Song, Yunxian et al., Genetic Engineering (Second Edition), Huazhong University of Science and Technology Press, 2022, 12 pages.

* cited by examiner

*Primary Examiner* — Heather Calamita
*Assistant Examiner* — Jessica D Parisi
(74) *Attorney, Agent, or Firm* — PORUS IP LLC

(57) ABSTRACT

A method for preparing a 5'-end ligation-based ssDNA-specific sequencing (Liss-seq) library is provided. The method includes: (a) treating a DNA sample to be tested that includes single-stranded DNA and double-stranded DNA with Klenow Fragment (3'→5'exo–) DNA polymerase to fill in 5' ends of the double-stranded DNA to obtain a first reaction product; (b) conducting a 3' end tail addition reaction on the first reaction product to obtain a second reaction product; (c) ligating the second reaction product with a renatured 5' hairpin adaptor to obtain a ligation product; a structure of 5' hairpin adaptor being: 5'-overhang-random base region-first stem region-loop region-second stem region-3', the first stem region and the second stem region forming a double-strand through a renaturation treatment; and (d) amplifying the ligation product to obtain the Liss-seq library, a length of the overhang being within a range of 0-20 nt.

12 Claims, 12 Drawing Sheets
Specification includes a Sequence Listing.

METHODS FOR PREPARING 5'-END LIGATION-BASED ssDNA-SPECIFIC SEQUENCING LIBRARIES

CROSS-REFERENCE TO RELATED APPLICATIONS

This application is a continuation-in-part application of International Application No. PCT/CN2024/123892, filed on Oct. 10, 2024, which claims priority to Chinese Patent Application No. 202410166121.7, filed on Feb. 6, 2024, the entire contents of each of which are hereby incorporated by reference.

SEQUENCE LISTING

The instant application contains a Sequence Listing which is submitted electronically in XML format and is hereby incorporated by reference in its entirety. The XML copy, created on Apr. 30, 2025, is named "2025 Apr. 30-Sequence list-6B 804-H006US00," and is 7,909 bytes in size.

TECHNICAL FIELD

The present disclosure relates to the field of biotechnology, and in particular, to a method for preparing a 5'-end ligation-based ssDNA-specific sequencing library.

BACKGROUND

High-throughput sequencing technology (HTS) is a revolutionary transformation of traditional Sanger sequencing (referred to as first-generation sequencing technology), which sequences hundreds of thousands to millions of nucleic acid molecules at a time, and it is therefore also known as next-generation sequencing technology (NGS). The rapid development of high-throughput sequencing technology has resolved and identified numerous genes associated with normal and pathogenic traits in humans, plants, and animals, thereby recognizing previously unknown biogenetic and developmental issues at the genome-wide level.

Many studies have indicated that a variety of DNA-related biological processes produce single-stranded DNA and free single-stranded DNA are present in human plasma. In order to explore the biological significance of single-stranded DNA, it is undoubtedly necessary to develop specific, sensitive and stable sequencing methods. Currently, the reported sequencing methods cannot specifically distinguish single-stranded DNA from double-stranded DNA in samples, thus failing to specifically sequence single-stranded DNA.

The process of the HTS generally includes four steps. The first step of the sequencing process is DNA library preparation including introducing sequencing adapters at the ends of different target DNAs in preparation for subsequent steps. Library preparation determines the direction of the entire sequencing process and is the root cause of the differences in sequencing methods. To specifically sequencing single-stranded DNA, methods for preparing libraries for still need to be improved.

In view of this, there is a need to provide a method for preparing a 5'-end ligation-based single-stranded DNA (ssDNA)-specific sequencing (Liss-seq) library, to establish highly specific, stable, and sensitive high-throughput sequencing technology for single-stranded DNA.

SUMMARY

One or more embodiments of the present disclosure provide a method for preparing a 5'-end ligation-based ssDNA-specific sequencing (Liss-seq) library, comprising: (a) treating a DNA sample to be tested that includes single-stranded DNA and double-stranded DNA with Klenow Fragment (3'→5'exo⁻) DNA polymerase to fill in 5' ends of the double-stranded DNA to obtain a first reaction product; (b) conducting a 3' end tail addition reaction on the first reaction product to obtain a second reaction product; (c) ligating the second reaction product with a renatured 5' hairpin adaptor to obtain a ligation product; wherein a structure of the 5' hairpin adaptor is: 5'-overhang-random base region-first stem region-loop region-second stem region-3', wherein the first stem region and the second stem region form a double-strand through a renaturation treatment; and (d) amplifying the ligation product to obtain the single-stranded DNA sequencing library; wherein a length of the overhang is within a range of 0-20 nt.

In some embodiments, a length of the random base region is within a range of 3-12 nt, a length of the first stem region is within a range of 8-25 nt, a length of the second stem region is within a range of 8-25 nt, and a length of the loop region is within a range of 5-50 nt.

In some embodiments, a length of the random base region is 6 nt, a length of the overhang is 12 nt, a length of the first stem region is 11 nt, a length of the second stem region is 11 nt, and a length of the loop region is 38 nt.

In some embodiments, a 5' end of the 5' hairpin adaptor is a hydroxyl group.

In some embodiments, a molar ratio of the 5' hairpin adaptor to the second reaction product is not less than 50:1.

In some embodiments, the method further comprises: performing phosphorylation treatment on the second reaction product before step (c).

BRIEF DESCRIPTION OF THE DRAWINGS

The present disclosure will be further illustrated by way of exemplary embodiments, which will be described in detail through the accompanying drawings, wherein.

DETAILED DESCRIPTION

Figure 1:
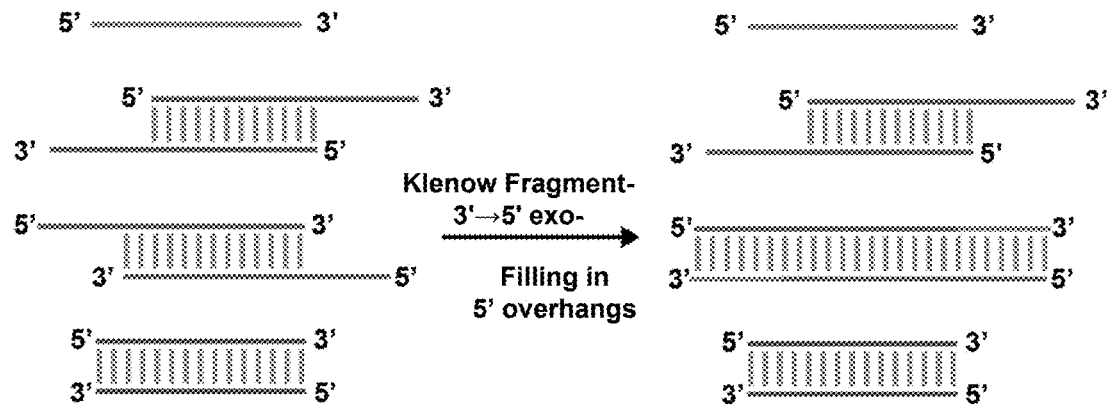
FIG. 1 is a schematic diagram illustrating filling in 5' overhangs to form blunt ends in double-stranded DNA according to some embodiments of the present disclosure.

In order to more clearly illustrate the technical solutions of the embodiments of the present disclosure, the following will provide a brief introduction to the drawings that are necessary for the description of the embodiments. It is evident that the drawings described below are merely examples or embodiments of the present disclosure, and for those of ordinary skill in the art, without the need for creative effort, the present disclosure can be applied to other similar situations based on these drawings.

The present disclosure aims to establish highly specific, stable, and sensitive high-throughput sequencing technology for single-stranded DNA (ssDNA), including the following technical solutions.

One or more embodiments of the present disclosure provide a 5' hairpin adaptor, a structure of which is: 5'-overhang-random base region-first stem region-loop region-second stem region-3', and the first stem region and the second stem region form a double-stranded structure through renaturation treatment.

In some embodiments, a 5' end or a 3' end of the 5' hairpin adaptor is a hydroxyl group.

In some embodiments, both the 5' end and the 3' end of the 5' hairpin adaptor are hydroxyl groups and contain no modification.

In some embodiments, the first stem region and the second stem region are complementary to each other and connect to each other by hydrogen bonds through corresponding relationship of different bases to form stem regions, and a double helix structure forms through performing renaturation treatment on the stem regions, thereby causing the 5' hairpin adaptor to form a stem-loop structure.

Renaturation treatment refers to a process of two complementary strands of denatured DNA fully or partially restoring to the natural double-helix structure under appropriate conditions. After thermal denaturation of DNA, the temperature is slowly lowered to gradually cool the DNA and maintained within a certain range below the melting temperature (Tm), allowing the denatured single-stranded DNA to restore its double-helix structure. Renaturation treatment is also known as annealing.

In some embodiments, the complementary pairing of the two complementary strands includes at least 75%, 80%, 85%, 90%, 95%, or complete complementarity.

In some embodiments, a length of the overhang is within a range of 0-20 nt. In some embodiments, a length of the overhang is within a range of 1-20 nt. In some embodiments, a length of the overhang includes 0, 1, 2, 3, 4, 5, 6, 7, 8, 9, 10, 11, 12, 13, 14, 15, 16, 17, 18, 19, 20 nt. In some embodiments, a length of the overhang is 12 nt.

In some embodiments, a length of the random base region is within a range of 1-12 nt. In some embodiments, a length of the random base region is within a range of 3-12 nt. In some embodiments, a length of the random base region is 6 nt.

In some embodiments, a length of the first stem region or the second stem region is within a range of 8-25 nt. In some embodiments, a length of the first stem region or the second stem region includes 8, 9, 10, 11, 12, 13, 14, 15, 16, 17, 18, 19, 20, 21, 22, 23, 24, 25 nt. In some embodiments, a length of the first stem region or the second stem region is 11 nt.

In some embodiments, lengths of the first stem region and the second stem region are the same or different.

In some embodiments, a length of the loop region is within a range of 0-50 nt. In some embodiments, a length of the loop region is within a range of 1-50 nt. In some embodiments, a length of the loop region is within a range of 5-50 nt. In some embodiments, a length of the loop region includes 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 nt. In some embodiments, a length of the loop region is 38 nt.

In some embodiments, the 5' hairpin adaptor has a sequence as shown in SEQ ID NO: 1.

In some embodiments, a molecular tag may be set in the loop region, for example, N10. In some embodiments, the molecular tag may be set at any position in the loop region.

In some embodiments, the 5' hairpin adaptor connected with the molecular tag has a sequence as shown in SEQ ID NO:2 or SEQ ID NO:3.

Figure 2:
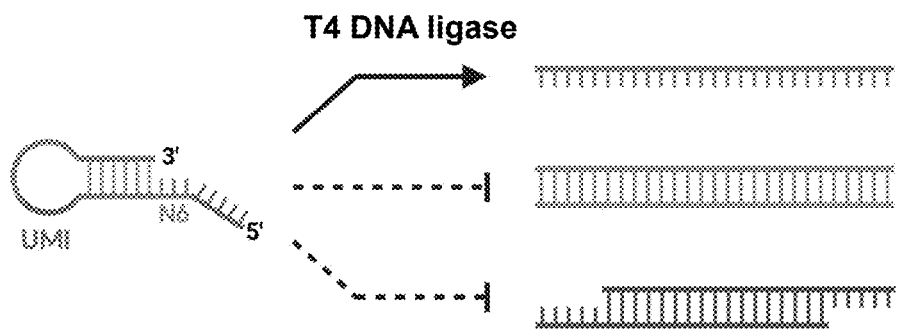
FIG. 2 is a schematic diagram illustrating a principle of hairpin adaptor-mediated specific ligation at the 5' end of single-stranded DNA according to some embodiments of the present disclosure.

In some embodiments, the 5' hairpin adaptor can include a 5' end sequence, random bases (N6), a unique molecular identifier (UMI), and a 3' end sequence, as shown in FIG. 2. The N6 is used for non-preferential pairing and ligation with the 5' end of single-stranded DNA, and the UMI may provide identification and classification for each adapter to distinguish each sequence. In addition, to prevent the hairpin adaptor from ligating with each other, both the 5' end and the 3' end are hydroxyl groups and contain no modification.

One or more embodiments of the present disclosure provide a method for preparing a 5'-end ligation-based ssDNA-specific sequencing (Liss-seq) library, comprising following steps.

(a) treating a DNA sample to be tested that includes single-stranded DNA and double-stranded DNA with DNA polymerase without exonuclease activity to fill in 5' ends of the double-stranded DNA to obtain a first reaction product.

As shown in FIG. 1 (left), there are three types of 5' end configurations of double-stranded DNA, namely, 3' overhang, blunt end, and 5' overhang. Due to the directionality of DNA synthesis, double-stranded DNA with a 5' overhang may be filled in to become a blunt end. In some embodiments, after end-filling with Klenow fragment 3'→5' exo (KF exo⁻), the 5' end configuration of double-stranded DNA in the system is simplified to two types (blunt end and 3' overhang), preparing for subsequent specific ligation, as shown in FIG. 1 (right).

In some embodiments, without exonuclease activity refers to the absence of 5'→3' exonuclease activity and/or 3'→5' exonuclease activity.

In some embodiments, the amount of DNA polymerase without exonuclease activity is not limited and the DNA polymerase without exonuclease activity may fully fill in the 5' overhang at any concentration, for example, 0.25-1.5 U/μL.

In some embodiments, the DNA polymerase without exonuclease activity includes KF exo⁻. Conventional DNA polymerases have exonuclease activity, and the KF exo⁻ is chosen to ensure the integrity of the single-stranded DNA in the system during the filling-in process. KF exo⁻ is the N-terminal truncated fragment of *E. coli* DNA polymerase I, which has neither 5'→3' exonuclease activity nor 3'→5' exonuclease activity.

(b) conducting a 3' end tail addition reaction on the first reaction product to obtain a second reaction product.

In some embodiments, the 3' end tail addition in step b) includes adding a poly(dA) tail, or adding a poly(dT) tail, a poly(dC) tail, and a poly(dG) tail.

In some embodiments, terminal transferase and dNTP are used for adding the tail.

In some embodiments, a reagent used for the 3' end tail addition reaction may be terminal transferase and dATP, thereby adding a poly(dA) tail.

In some embodiments, the terminal transferase is terminal deoxynucleotidyl transferase (TdT), which is a non-template-dependent DNA polymerase that can catalyze an addition of dNTP to 3' hydroxyl end of oligonucleotides, single-stranded, or double-stranded DNA.

In some embodiments, a molar ratio of dATP and the first reaction product (the DNA obtained from step a)) in the reaction system of step (b) may be adjusted according to a total amount of DNA in the system, for example, greater than 100 or 100-5000. In some embodiments, a molar ratio of dATP and the first reaction product may be 100, 500, 1000, or 5000, all of which have good tail addition effects.

In some embodiments, before the 3' end tail addition reaction in step (b), the method further includes a step of dephosphorylation treatment or purification of the first reaction product obtained from step (a).

Dephosphorylation treatment refers to the use of phosphatase to remove the effects of dNTP in the system. In some embodiments, the phosphatase may include recombinant shrimp alkaline phosphatase (rSAP).

The method for DNA purification may be conventionally known in the art. In some embodiments, phenol-chloroform-isoamyl alcohol may be used to purify DNA.

(c) ligating the second reaction product with a renatured 5' hairpin adaptor to obtain a ligation product; a structure of the 5' hairpin adaptor being: 5'-overhang-random base region-first stem region-loop region-second stem region-3', the first stem region and the second stem region forming a double-strand through renaturation treatment.

By designing the hairpin adaptor with the 5' overhang, it is possible to prevent the ligation of the adapter to double-stranded DNA based on the spatial steric hindrance of the overhang of the hairpin adaptor with the 5' end configurations of the two types of double-stranded DNA after filling-in, thereby specifically ligating the single-stranded DNA in the system.

In some embodiments, a molar ratio of the 5' hairpin adaptor to the second reaction product is greater than 12.5:1. In some embodiments, a molar ratio of the 5' hairpin adaptor to the second reaction product is not less than 50:1. In some embodiments, a molar ratio of the 5' hairpin adaptor to the second reaction product is 50:1. The second reaction product is the DNA obtained after treatment in step (b).

In some embodiments, before ligating in step (c), the method further includes a step of phosphorylation treatment of the second reaction product obtained from step b), which can improve the ligation effect.

In some embodiments, T4 polynucleotide kinase (T4 PNK) is used for phosphorylation treatment. In some embodiments, the phosphorylation treatment is followed by a purification step.

In some embodiments, the ligating the second reaction product with a renatured 5' hairpin adaptor is achieved using T4 DNA ligase.

In some embodiments, before amplifying in step (d), the method further includes a step of purifying the ligation product (single-stranded DNA ligation product).

In some embodiments, when the 3' end tail addition is an addition of a poly(dA) tail, Oligo d(T)$_{25}$ magnetic beads may be used for purification.

(d) amplifying the ligation product to obtain the Liss-seq library; a length of the overhang being within a range of 0-20 nt.

In some embodiments, primers including a tag sequence (Index) are used in the amplification of step (d). By using primers including the tag sequence to amplify the ligation product, it is possible to distinguish data from different sample sources during sequencing and identify the sample source.

In some embodiments, the tag sequence may be introduced into the 5' end of the ligation product in step (c), or into the 3' end of the ligation product in step (c). The design method of the tag sequence is conventionally known to those skilled in the art, and the design of primers including the tag sequence is also conventionally known to those skilled in the art.

As used herein, "amplification treatment" may be divided into two major categories: variable temperature amplification and isothermal amplification. Variable temperature amplification mainly includes classic polymerase chain reaction (PCR) and ligase chain reaction (LCR), while isothermal amplification includes strand displacement amplification (SDA), rolling circle amplification (RCA), loop-mediated amplification (LAMP), helicase-dependent isothermal DNA amplification (HDA), nucleic acid sequence-based amplification (NASBA), and transcription-based amplification system (TAS). In some embodiments, the construction of the single-stranded DNA sequencing library may be performed using PCR amplification.

One or more embodiments of the disclosure provide a high-throughput sequencing method for the Liss-seq library prepared based on the aforementioned method.

In some embodiments, the method includes preparing the Liss-seq library according to the aforementioned method and sequencing the Liss-seq library.

In some embodiments, the sequencing may be performed using high-throughput sequencing platforms including Illumina NovaSeq, HiSeq X Ten, Illumina HiSeq, Illumina MiSeq, PacBio Sequel, 10× Genomics, and MGISEQ-2000.

One or more embodiments of the disclosure provide a kit for preparing a ssDNA high-throughput sequencing library, the kit including the 5' hairpin adaptor.

In some embodiments, the kit further includes a DNA polymerase without exonuclease activity. In some embodiments, the DNA polymerase is KF exo⁻.

In some embodiments, the kit further includes one or more of a dephosphorylation reagent, a tail addition reagent, a DNA purification reagent, and an amplification reagent.

In some embodiments, the dephosphorylation reagent is dephosphorylation enzyme. In some embodiments, the dephosphorylation enzyme is shrimp alkaline phosphatase (SAP).

In some embodiments, the tail addition reagent includes terminal transferase and/or nucleotides. In some embodiments, the terminal transferase is TdT. In some embodiments, the nucleotides are dATP.

In some embodiments, the amplification reagent includes at least one forward primer and at least one reverse primer. In some embodiments, the forward primer includes a tag sequence. In some embodiments, the reverse primer includes a tag sequence. In some embodiments, the amplification reagent includes three reverse primers. In some embodiments, the sequences of the primers are shown as SEQ ID No: 4-7, respectively.

One or more embodiments of the disclosure provide a device or system for preparing the Liss-seq library, the device including: a 5' overhang filling-in unit, a 3' end tail addition unit, a 5' hairpin adaptor ligation unit, and an amplification unit.

In some embodiments, the 5' overhang filling-in unit is configured to fill in the 5' overhang of double-stranded DNA using a DNA polymerase without exonuclease activity.

In some embodiments, the 3' end tail addition unit is configured to conduct a 3' end tail addition reaction. In some embodiments, the 3' end tail addition unit is poly(dA).

In some embodiments, the 5' hairpin adaptor ligation unit is configured to ligate the 5' hairpin adaptor, and a structure of the 5' hairpin adaptor is as described above.

In some embodiments, a length of the random base region is 6 nt, a length of the overhang is 12 nt, a length of the first stem region is 11 nt, a length of the second stem region is 11 nt, and a length of the loop region is 38 nt.

As used herein, the term "DNA" may be any polymer containing deoxyribonucleotides, including but not limited to modified or unmodified DNA. Those skilled in the art will understand that the source of genomic DNA is not particularly limited, and the genomic DNA may be obtained from any possible source, such as being commercially available directly, obtained directly from other laboratories, or extracted directly from samples. In some embodiments of the present disclosure, single-stranded DNA molecules may be obtained by reverse transcription of RNA. In other embodiments of the present disclosure, single-stranded DNA molecules may be cDNA molecules obtained by reverse transcription of RNA. In some embodiments of the present disclosure, single-stranded DNA molecules may be obtained by denaturing double-stranded DNA samples. In other embodiments of the present disclosure, single-stranded DNA molecules may be obtained by thermal denaturation of double-stranded DNA samples. An amount of single-stranded DNA in the embodiments of the present disclosure is not particularly limited. A length of single-stranded DNA molecules in the embodiments of the present disclosure is not particularly limited. In some embodiments, a length of single-stranded DNA molecules is greater than 20 nt. In some embodiments, a length of single-stranded DNA molecules includes 20-80 nt or 80-100 nt. In some embodiments, a length of single-stranded DNA molecules includes 20 nt, 40 nt, 79 nt, or 80 nt.

In some embodiments, single-stranded DNA molecules may be obtained by reverse transcription of RNA. In some embodiments, single-stranded DNA molecules may be cDNA molecules obtained by reverse transcription of RNA. In some embodiments, single-stranded DNA molecules may be obtained by extracting from a target sample to be tested. In some embodiments, the target sample to be tested may include peripheral blood, tissues, blood, serum, plasma, urine, saliva, semen, milk, cerebrospinal fluid, tears, sputum, mucus, lymph, cytoplasm, ascites, pleural effusion, amniotic fluid, bladder lavage fluid, and bronchoalveolar lavage fluid taken from animals (e.g., humans). In some embodiments, the target sample to be tested may also be taken from bacterial cultures, bacterial colonies, viral suspensions, environmental concentrates, food, raw materials, water samples, or water concentrates. In some embodiments, the target sample to be tested may include single-stranded DNA molecules and may also include other non-target nucleic acids. In some embodiments, the target sample to be tested includes at least 1 fmol of single-stranded DNA molecules.

The following further illustrates the present disclosure with specific examples, but the scope of protection of the present disclosure is not limited to these examples. Any technician familiar with the technical field can make, within the technical scope disclosed by the present disclosure, equivalent substitutions or modifications based on the technical solutions and inventive concepts of the present disclosure, and these should be covered within the scope of protection of the present disclosure.

Materials and reagents used in the examples described below, unless otherwise specified, may be obtained from commercial sources.

Information on the reagents used in the examples of the present disclosure is shown in Table 1.

TABLE 1

| Reagents | Manufacturer | Item number | Concentration |
|---|---|---|---|
| Klenow Fragment (3'→5' exo⁻) | NEB | M0212L | 5 U/μL |
| CutSmart buffer | NEB | B7204S | 10× |
| dNTP mixture | NEB | N0447S | 10 mM |
| Shrimp Alkaline Phosphatase (rSAP) | NEB | M0371S | 1 U/μL |
| Terminal Transferase (TdT) | NEB | M0315L | 20 U/μL |
| Terminal Transferase buffer | NEB | B0315S | 10× |
| dATP | NEB | N0440S | 100 mM |
| T4 Polynucleotide Kinase (T4 PNK) | NEB | M0201L | 10 U/μL |
| Adenosine 5'-Triphosphate (ATP) | NEB | P0756S | 10 mM |
| 1,4-Dithiothreitol (DTT) | Aladdin | D265376-25g | 50 mM |
| T4 DNA ligase | NEB | M0202L | 400 U/μL |
| T4 DNA ligase buffer | NEB | B0202S | 10× |
| PEG8000 | Sigma | 89510-250G-F | 50% |
| 5' adapter UMI-L-M | Sangon Biotech | | 50 μM |

TABLE 1-continued

| Reagents | Manufacturer | Item number | Concentration |
|---|---|---|---|
| Phanta Max Super-Fidelity DNA polymerase | Vazyme | P505-d1 | |
| dNTP Mix (10 mM each) | | | |
| 2× Phanta Max Buffer | | | |
| Oligo d(T)$_{25}$ Magnetic Beads | NEB | S1419S | |
| VAHTS DNA Clean beads | Vazyme | N411-01-AA | |
| DNA Extraction Reagent | Solarbio | P1012 | |

EXAMPLES

Example 1. 5'-End Ligation-Based ssDNA-Specific Sequencing (Liss-Seq)

Step 1. Filling in 5' Overhangs of Double-Stranded DNA (dsDNA)

First, 5'-ends of a DNA sample were filled in to reduce the complexity of the 5'-ends of dsDNA in the DNA sample, preparing for the subsequent specific ligation.

TABLE 2

| DNA | x µL |
|---|---|
| 10× CutSmart buffer | 5 µL |
| 10 mM dNTP mixture | 0.5 µL |
| Klenow Fragment (3'→5' exo-) | 3 µL |
| ddH$_2$O | Adjust the volume to 50 µL |
| Total volume | 50 µL |

The reaction system is shown in Table 2, and the content of single-stranded DNA in the DNA sample is not particularly restricted. When the amount of single-stranded DNA is greater than or equal to 1 fmol, and a mass of the single-stranded DNA is greater than or equal to 25 pg, the efficiency of constructing a sequencing library is high, and the accuracy is high. Sample was thoroughly mixed, centrifuged, and then placed in a PCR machine for incubating at 37° C. for 30 minutes. After the reaction was completed, the obtained reaction product was immediately stored at 4° C. or on ice.

To verify whether the 5' overhang of dsDNA is filled in by Klenow Fragment, dsDNA with a 5' overhang was synthesized, a length of the 5' overhang was 10 nt, only the terminal was two A bases. Only when the 5' overhang is filled, biotin-labeled dUTP may be incorporated and then detected by streptavidin.

Using 10 pmol of the above dsDNA (with 5' overhang), end filling was performed by adding varying concentrations of KF exo⁻ (0.25, 0.5, 0.75, 1.0, and 1.5 U/µL), followed by urea-denaturing gel electrophoresis, and detection using a chemiluminescent biotin-labeled nucleic acid detection kit.

Figure 4:
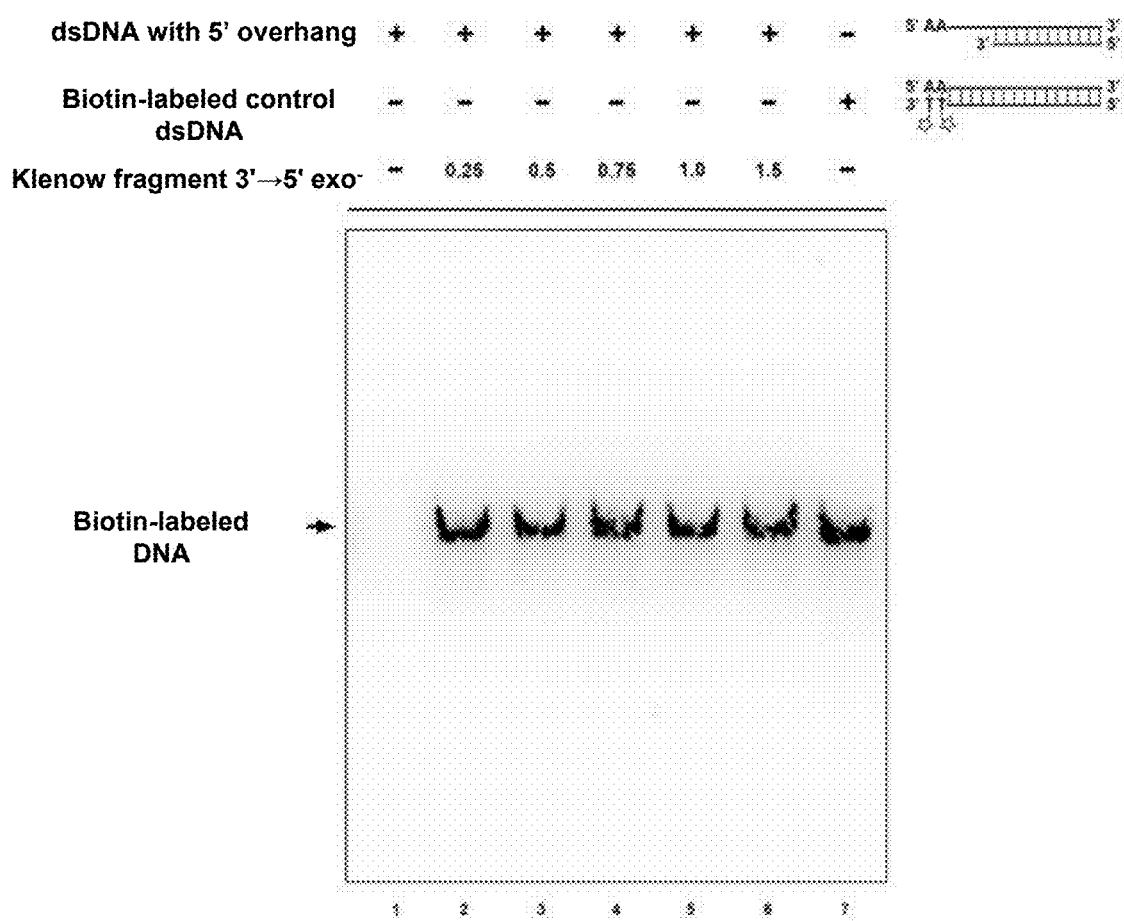
FIG. 4 is a schematic diagram of a DNA structure with filled-in 5' overhangs and corresponding verification results according to some embodiments of the present disclosure.

The experimental results, as shown in FIG. 4, indicate that the 5' overhang of dsDNA is fully filled in. Lane 1 is a negative control without KF exo, and Lane 7 is a positive control with an equal amount of biotin-labeled dsDNA.

Step 2. Dephosphorylation of Excess dNTP

Since there was an excess of dNTP in the system after the filling reaction in the previous step, to avoid its impact on subsequent DNA 3' end tail addition reaction, it was necessary to use rSAP for dephosphorylation treatment.

TABLE 3

| Reaction product from step 1 | 50 µL |
|---|---|
| rSAP | 2 µL |
| Total volume | 52 µL |

The reaction system is shown in Table 3. The rSAP was added to the system after the reaction of step 1, mixed thoroughly, and then centrifuged to obtain a mixture. The mixture was placed in a PCR machine for incubation at 37° C. for 60 minutes. After the reaction was completed, the obtained reaction product was immediately stored at 4° C. or on ice.

Step 3. DNA Purification

Phenol-chloroform-isoamyl alcohol (DNA extraction reagent) was used to purify the reaction product from step 2 to remove enzymes, buffers, etc. from the reaction system, while preventing loss of small fragments in the sample. Finally, 40 µL of ddH$_2$O was added to dissolve the reaction product for a subsequent tail addition reaction.

Step 4. 3' End Tail Addition

Using TdT, a polydeoxyadenylate (Poly(dA)) tail (also referred to as Poly-dA tail) was formed at the 3' end of the aforementioned reaction product. The Poly(dA) tail served as 3' primer in subsequent steps or was used for specific enrichment and purification of the reaction product.

TABLE 4

| The purified and recovered reaction product from step 3 | 40 µL |
|---|---|
| Terminal Transferase buffer | 5 µL |
| Terminal Transferase | 4 µL |
| 100 µM dATP | 1 µL (a molar ratio range of dATP to DNA being 100-5000) |
| Total volume | 50 µL |

The reaction system is shown in Table 4. The amount of dATP may be adjusted according to the DNA content in the sample, and the molar ratio of dATP to DNA between 100 to 5000 can ensure sufficient addition of poly(dA) tail. After adding the aforementioned reactants, the mixture was thoroughly mixed, centrifuged, and then placed in a PCR machine for incubation at 37° C. for 15 minutes. After the reaction is completed, the reaction product was immediately stored at 4° C. or on ice.

To investigate whether TdT enzyme can add an appropriate length of poly(dA) tail to the 3' end of a single-stranded DNA molecule, a single-stranded DNA (ss80) with a length of 80 nt was synthesized. By setting a gradient experiment of molar ratios of dATP to DNA, different concentrations of dATP were added to 5 pmol of ss80 at molar ratios of 100:1, 500:1, 1000:1, and 5000:1, respectively. Subsequently, the 3' end tail addition reaction was performed using TdT enzyme.

After the reaction, a length of the poly(dA) tail was detected using non-denaturing polyacrylamide gel electrophoresis technology.

Figure 5:
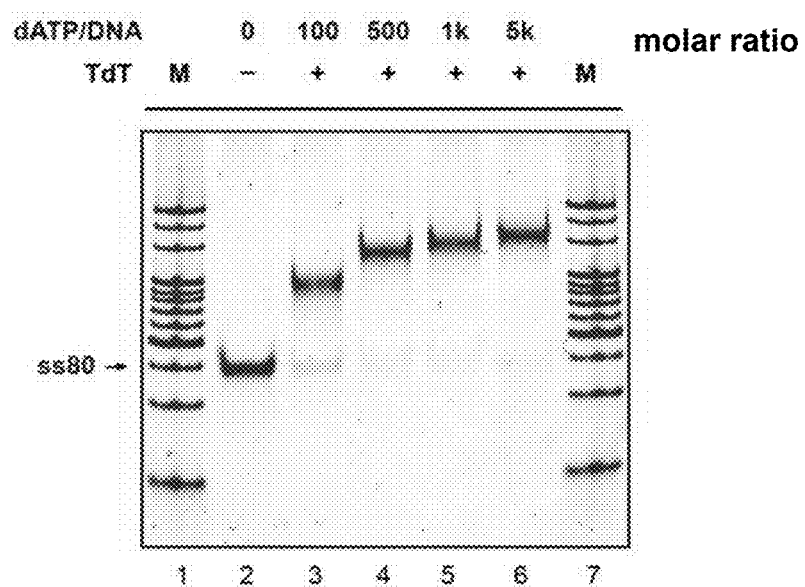
FIG. 5 is a graph illustrating results verifying the tail addition effect under different dATP/DNA ratios according to some embodiments of the present disclosure.

The experimental results are shown in FIG. 5, and M refers to a marker. When the molar ratio of dATP to DNA is greater than 100, TdT can sufficiently add an appropriate length of poly(dA) tail (greater than 20 nt) to single-stranded DNA. When the length of the poly(dA) tail is greater than 20 nt, it is beneficial for subsequent magnetic bead purification and PCR amplification.

Step 5. 5' End Phosphorylation of DNA

A T4 DNA ligase-mediated ligation reaction required a 5' phosphate group of a target DNA. Therefore, before 5' end adapter ligation, the obtained reaction product from step 4 needed to undergo 5' end phosphorylation treatment using T4 PNK.

TABLE 5

| The reaction product from step 4 | 50 μL |
|---|---|
| Terminal Transferase buffer | 3 μL |
| ATP | 8 μL |
| DTT | 8 μL |
| T4 PNK | 1 μL |
| ddH$_2$O | Adjust the volume to 80 μL |
| Total volume | 80 μL |

The reaction system is shown in Table 5. The samples were thoroughly mixed, centrifuged, and then placed in a PCR machine for incubating at 37° C. for 30 minutes. After the reaction is completed, the obtained reaction product was immediately stored at 4° C. or on ice.

Step 6. Column Purification

The reaction product from step 5 was purified and recovered using the GeneJET Purification Kit (Thermo Scientific, Cat. No. K0702) according to the manufacturer's instruction to remove enzymes, buffers, etc. Finally, 40 μL of ddH$_2$O was added to dissolve the purified and recovered reaction product for subsequent ligation reaction.

Step 7. Specific Ligation Mediated by 5' Hairpin Adaptor

T4 DNA ligase was used to ligate the purified and recovered reaction product with the renatured 5' end adapter. After renaturation, the adapter may form a stem-loop structure (including an 11 bp complementary pairing region (stem region) and a 38 nt non-complementary pairing region (loop region)). The 5' end of the hairpin adaptor has an 18 nt overhang including six random deoxynucleotides NNNNNN (N6), which can not only complementarily pair with ssDNA, but also prevent the adapter from ligating to dsDNA. Moreover, to prevent the self-ligation of the hairpin adaptor, the 5' end of the adapter is a hydroxyl group rather than a phosphate group. Additionally, the loop region also has a 10 nt random deoxynucleotide sequence N10 as a unique molecular identifier (UMI) for accurately distinguishing of DNA templates from different sources in subsequent steps, as shown in FIG. 2.

The sequence of the adapter is shown in SEQ ID NO:1, and the subsequent experiments were performed using two sets of adapters with UMI, i.e., UMI-L-M and UMI-L-R. The sequence of UMI-L-M is shown in SEQ ID NO:2, and the sequence of UMI-L-R is shown in SEQ ID NO:3. The difference between UMI-L-M and UMI-L-R is the position of the UMI sequence in the loop region. The UMI sequence of UMI-L-M is located near the 5' end, while the UMI sequence of UMI-L-R is located near the 3' end. Both UMI-L-M and UMI-L-R have high ligation efficiency. The sequence information is as follows.

```
SEQ ID NO: 1:
GAGATACCCGTGNNNNNNNTAGGTGCCTACGAGGAGATA

CGCCGTAAGGACGACTTGGGTAGGCACCTA;

SEQ ID NO: 2:
GAGATACCCGTGNNNNNNNTAGGTGCCTACGAGGAGATA

CNNNNNNNNNNGCCGTAAGGACGACTTGGGTAGGCACC

TA;

SEQ ID NO: 3:
GAGATACCCGTGNNNNNNNTAGGTGCCTACGAGGAGATA

CGCCGTAAGGACGACTTNNNNNNNNNNGGGTAGGCACC

TA.
```

(1) Renaturation of the 5' End Adapter

The 5' hairpin adaptor solution was diluted with ddH$_2$O. During dilution, 10× annealing buffer (100 mM Tris-HCl (pH 8.0), 500 mM NaCl) was added, then subjected to renaturation according to the renaturation program, which is shown in Table 6.

TABLE 6

| Step | Temperature | Heating rate of the program | Duration |
|---|---|---|---|
| Denaturation | 95° C. | | 5 min |
| Renaturation | 95-85° C. | −2° C./s | |
| | 85-25° C. | −0.1° C./s | |
| Maintaining | 4° C. | | Maintaining |

(2) Ligation of the 5' End Adapter

TABLE 7

| The purified and recovered reaction product from step 6 | 36 μL |
|---|---|
| T4 DNA ligase buffer | 8 μL |
| PEG8000 | 32 μL |
| Renatured adapter UMI-L-M | 1 μL |
| T4 DNA ligase | 3 μL |
| Total volume | 80 μL |

The reaction system is shown in Table 7. The sample was thoroughly mixed and centrifuged, then placed in a PCR machine for incubating at 16° C. for 2 hours, followed by incubating at 75° C. for 20 minutes to inactivate the ligase. After the reaction is completed, the obtained reaction product was immediately stored at 4° C. or on ice.

Figure 6:
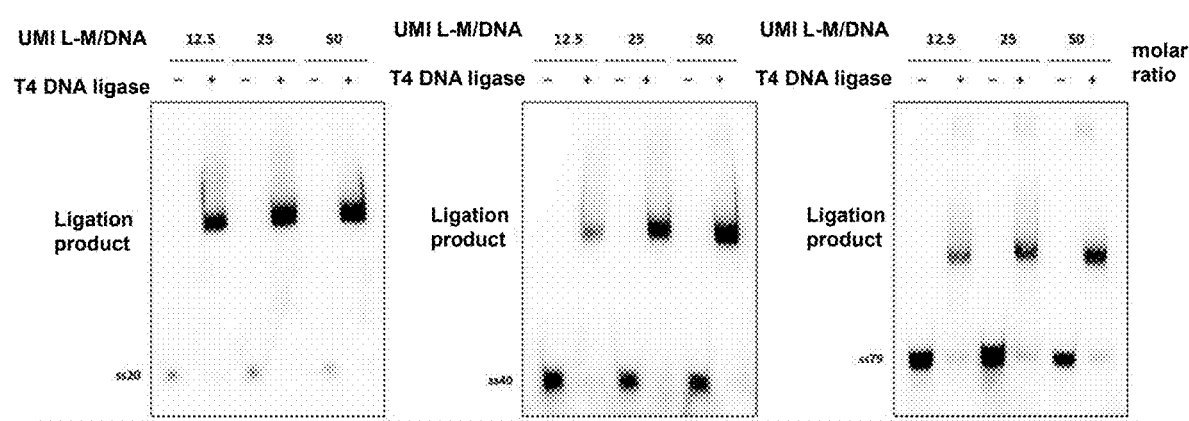
FIG. 6 is a graph illustrating results verifying the ligation effect under different adapter/DNA ratios according to some embodiments of the present disclosure.

To determine conditions for efficient ligation of the adapter (UMI-L-M) with the target DNA, experiments were conducted on molar ratios of the adapter/DNA (UMI-L-M/DNA). The adapter was mixed with biotinylated ssDNA of different lengths: ss20 (20 nt), ss40 (40 nt), ss79 (79 nt) at different molar ratios (12.5:1, 25:1, 50:1), followed by ligation reaction. After the ligation reaction is completed, urea polyacrylamide gel electrophoresis was performed, followed by biotin detection. As shown in FIG. 6, the results indicate that when the molar ratio of the adapter to DNA is 50:1, it can achieve efficient ligation reaction between the adapter and different lengths of target DNA using T4 DNA ligase.

Experiments were conducted to verify the specific ligation of single-stranded DNA mediated by the 5' hairpin adaptor. Double-stranded DNA including a 3' overhang (ds95), double-stranded DNA including a 5' overhang (ds80), and a smaller single-stranded DNA (ss50) was designed and synthesized for specificity verification. To maintain consistency and the possibility of ligation with the hairpin adaptor, the overhangs of ds80 and ss50 were both 6 random deoxyribonucleotides.

To verify the specificity of the ligation, ss50 was mixed with ds95 and ds80 separately, and after mixing, end-filling reaction was performed, followed by detection of specific ligation reaction. To detect the specific ligation of the hairpin adaptor with single-stranded DNA, biotinylated modified UMI-L-M adapter was used. By detecting the size of the ligation product, the specificity of the ligation between the adapter and single-stranded DNA may be verified (the ligation product of the adapter with ss50 (ss50+adapter) is the smallest, while the non-specific ligation products of the adapter with ds80 or ds95 are larger).

Figure 7:
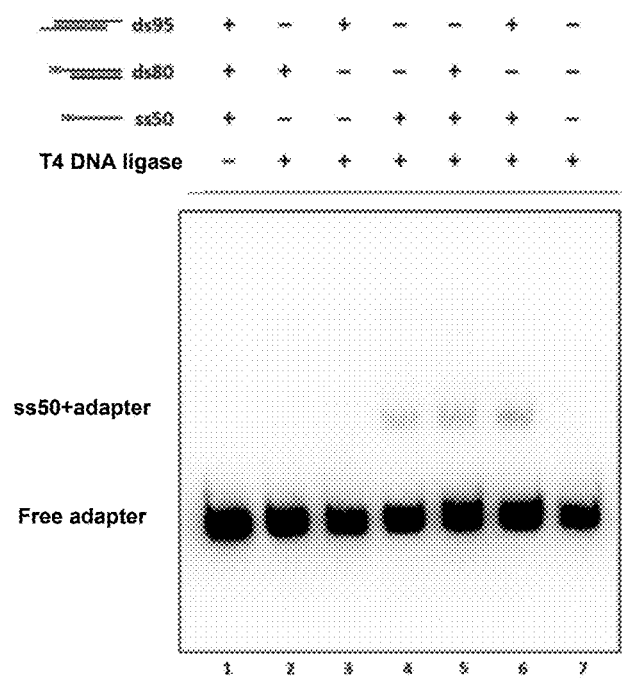
FIG. 7 is a graph illustrating verification results of the specific ligation of a 5' hairpin adaptor to single-stranded DNA according to some embodiments of the present disclosure.

As shown in FIG. 7, Lane 1 is the control without ligase, Lane 7 is the blank control with only biotinylated adapter, and Lanes 2, 3, and 4 are the separate reaction systems of only ds80, ds95, ss50 with the adapter, respectively. The results indicate that free adapters are present in each lane, no ligation product is present in Lanes 2 and 3, while the ligation product of ss50 with the adapter is present in Lane 4. Lanes 5 and 6 are the reaction systems of the mixed systems of ss50 with ds80 and ds95 at a ratio of 1:1 respectively with the adapter. It can be found that in the mixed system of single-stranded DNA and double-stranded DNA, the 5' hairpin adaptor still only ligates with ss50, and no non-specific ligation product of the adapter with ds80 or ds95 are present. In addition, there is almost no difference in the amount of ligation products in Lanes 4, 5, and 6, indicating that the adapter is also sufficiently ligated to ss50 in the mixed system.

The above results indicate that the 5' hairpin adaptor can specifically and efficiently ligate single-stranded DNA in the system, thereby enabling library construction and high-throughput sequencing according to conventional technique for specific sequencing of single-stranded DNA.

Step 8. Purification by Poly(dT) Magnetic Beads

Magnetic beads (Oligo d(T)$_{25}$ Magnetic Beads, NEBS 14195) were used to purify and recover the target single-stranded DNA product ligated with the hairpin adaptor, while removing the excess 5' end adapter.

The following operations were modified and optimized according to instructions of the magnetic beads.

1. 100 μL of Lysis/Binding solution was added to a 200-μL centrifuge tube, then 20 μL of magnetic bead suspension was added. The mixture was vortexed briefly and incubated at room temperature for 2 minutes.
2. The centrifuge tube was placed on a magnetic rack and incubated for 2 minutes, then the supernatant was discarded.
3. 20 μL of ddH$_2$O was added to 80 μL of the sample mixture, and then the mixed solution was added to the equilibrated magnetic beads and mixed well.
4. The centrifuge tube was placed in a PCR machine. The sample was heated at 65° C. for 5 minutes and then rapidly cooled to 4° C. The centrifuge tube was taken out when the temperature reached 4° C.
5. The centrifuge tube was incubated at room temperature for 10 minutes.
6. The centrifuge tube was placed on a magnetic rack and incubated for 5 minutes, then the supernatant was discarded.
7. 100 μL of wash buffer 1 (WB 1) was added to the centrifuge tube and mixed well using a pipette.
8. The centrifuge tube was placed on a magnetic rack and incubated for 2 minutes, then the supernatant was discarded.
9. 100 μL of wash buffer 2 (WB 2) was added to the centrifuge tube and mixed well using a pipette.
10. The centrifuge tube was placed on a magnetic rack and incubated for 2 minutes, then the supernatant was discarded.
11. 100 μL of low salt buffer (LSB) was added to the centrifuge tube and mixed well using a pipette.
12. The centrifuge tube was placed on a magnetic rack and incubated for 2 minutes, then the supernatant was discarded.
13. 36 μL of ddH$_2$O was added and mixed well using a pipette.
14. The centrifuge tube was placed in a PCR machine. The sample was heated at 95° C. for 5 minutes and then cooled to 25° C. When the temperature reached 25° C., the centrifuge tube was taken out, placed on a magnetic rack, and incubated for 2 minutes.
15. The supernatant was transferred to a new tube for using immediately or storing at −20° C.

Step 9. PCR Amplification

The single-stranded DNA in the purified and recovered product from the previous step includes a 3' end Poly(dA) tail and a ligated 5' end adapter, which is used as a template for PCR amplification to obtain a specific single-stranded DNA library. The primer sequences used for PCR amplification are shown in Table 8. The reaction system is shown in Table 9.

TABLE 8

| Primer | Sequence (5'-3') | SEQ ID NO: |
|---|---|---|
| UMI primer-F | AATGATACGGCGACCACCGAGATCTACA CTCTTTCCCTACACGACGCTCTTCCGAT CTTAGGTGCCTACGAGGAGATA | 4 |
| T-IAP-R1 | CAAGCAGAAGACGGCATACGAGATCGTG ATGTGACTGGAGTTCAGACGTGTGCTCT TCCGATCTTTTTTTTTTTTTTTTTTTTT TTTVN | 5 |
| T-IAP-R2 | CAAGCAGAAGACGGCATACGAGATACAT CGGTGACTGGAGTTCAGACGTGTGCTCT TCCGATCTTTTTTTTTTTTTTTTTTTTT TTTVN | 6 |
| T-IAP-R3 | CAAGCAGAAGACGGCATACGAGATGCCT AAGTGACTGGAGTTCAGACGTGTGCTCT TCCGATCTTTTTTTTTTTTTTTTTTTTT TTTVN | 7 |

Note:
the underline represents the Index, F represents the forward primer, and R represents the reverse primer. Different reverse primers may be used for different samples, allowing for multiplexing and subsequent sequencing during sequencing. In the three sets of replicates of present disclosure, different reverse primers are used for amplification.

TABLE 9

| The purified and recovered product from step 8 | 36 μL |
|---|---|
| 2× Phanta Max Buffer | 40 μL |

TABLE 9-continued

| | |
|---|---|
| 10 mM dNTP | 1 μL |
| 5 μM primer F | 1 μL |
| 5 μM primer R | 1 μL |
| Phanta Max Super-Fidelity DNA polymerase | 1 μL |
| Total volume | 80 μL |

TABLE 10

| Step 1 | Step 2 | Step 3 | Step 4 | Step 5 | Step 6 |
|---|---|---|---|---|---|
| 95° C. 3 min | 95° C. 15 s | 58° C. 15 s | 72° C. 45 s | 72° C. 5 min | 4° C. — |
| | | Cycling steps 2-4 for 18 times (adjusting according to an initial amount) | | | |

Step 10. Fragment Selection

Figure 3:
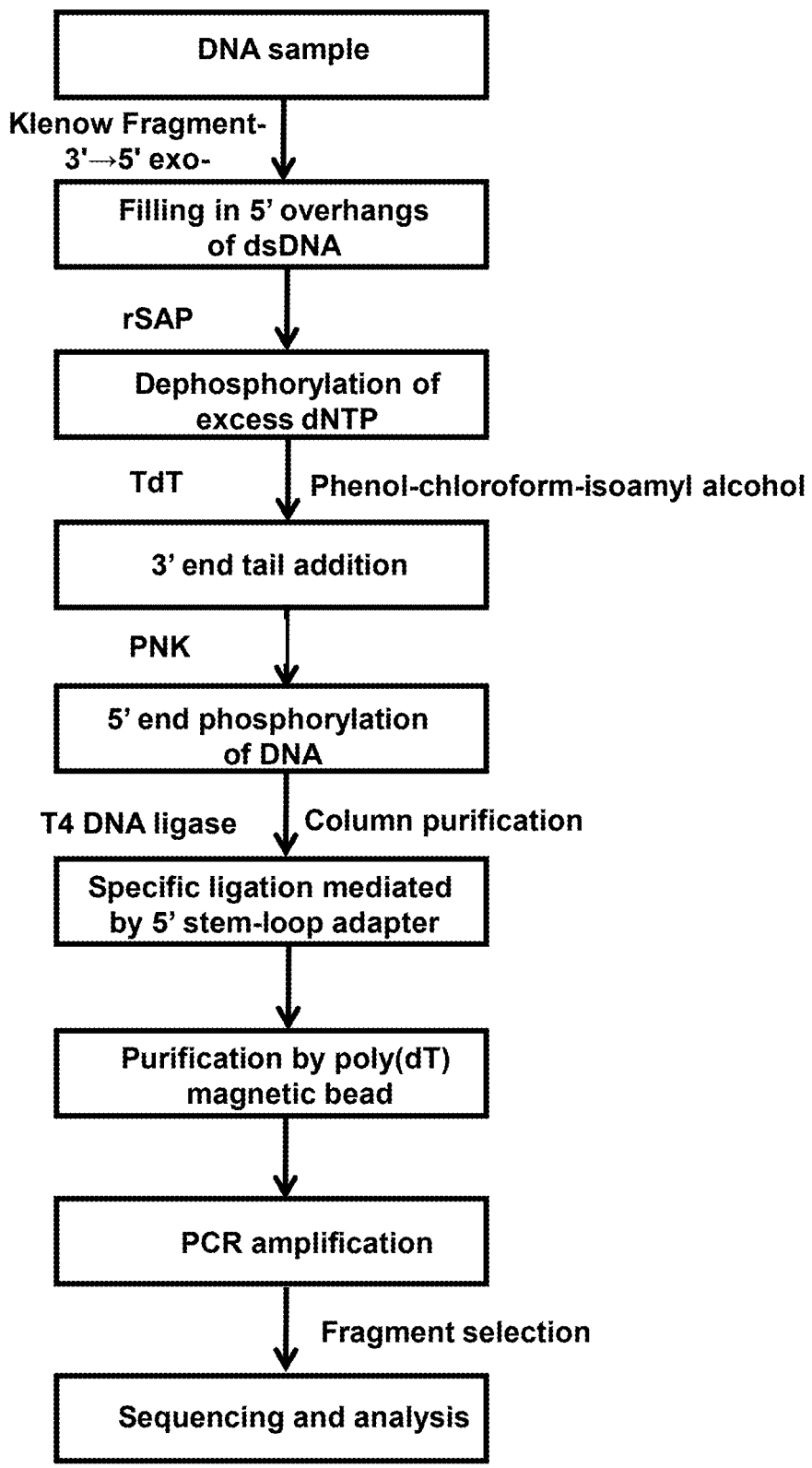
FIG. 3 is an exemplary flowchart of specific sequencing of 5'-end-ligation-based single-stranded DNA according to some embodiments of the present disclosure.

Before sequencing, the PCR product was purified and recovered using VAHTS DNA Clean beads (Vazyme, N411-01-AA) according to the instruction to remove residual DNA polymerase, dNTP mixtures, inorganic salts, and redundant primers from the reaction system, ultimately yielding a library for directly sequencing. FIG. 3 is an exemplary flowchart of specific sequencing of 5′-end-ligation-based single-stranded DNA according to some embodiments of the present disclosure.

Figure 8:
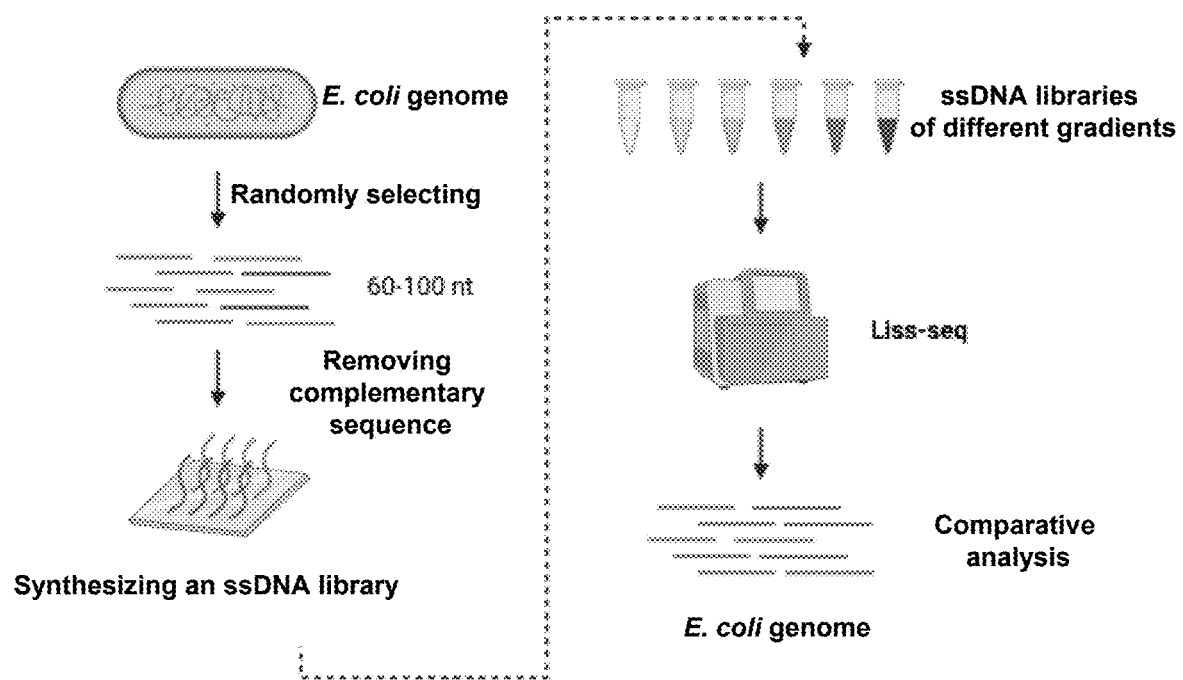
FIG. 8 is a schematic diagram illustrating synthesizing single-stranded DNA and verifying quality of prepared library through high-throughput sequencing according to some embodiments of the present disclosure.

Example 2. Verification of Sensitivity and Stability of the Liss-Seq Library by High-Throughput Sequencing In order to confirm its feasibility, sensitivity, as well as stability, an ssDNA library including 200 ssDNA sequences was synthesized from an *E. coli* genome by randomly selecting ssDNA sequences with a length of 60-100 nt and removing complementary sequences, and then the ssDNA library was formulated into different gradients and analyzed after constructing and sequencing library (as shown in FIG. 8).

The ssDNA libraries of different gradients (from 1 fmol to 640 fmol) were constructed into Liss-seq libraries using the above-mentioned method, followed by high-throughput sequencing using Nova seq 6000 for comparative analysis. According to different initial amount of DNA used for library construction, a number of PCR cycles in Table 10 was adjusted to balance the library DNA obtained for each gradient. The number of PCR cycles were 30, 20, 18, 16, and 14, respectively, according to the initial amount from low to high, with 3 replicates for each group.

Figure 9:
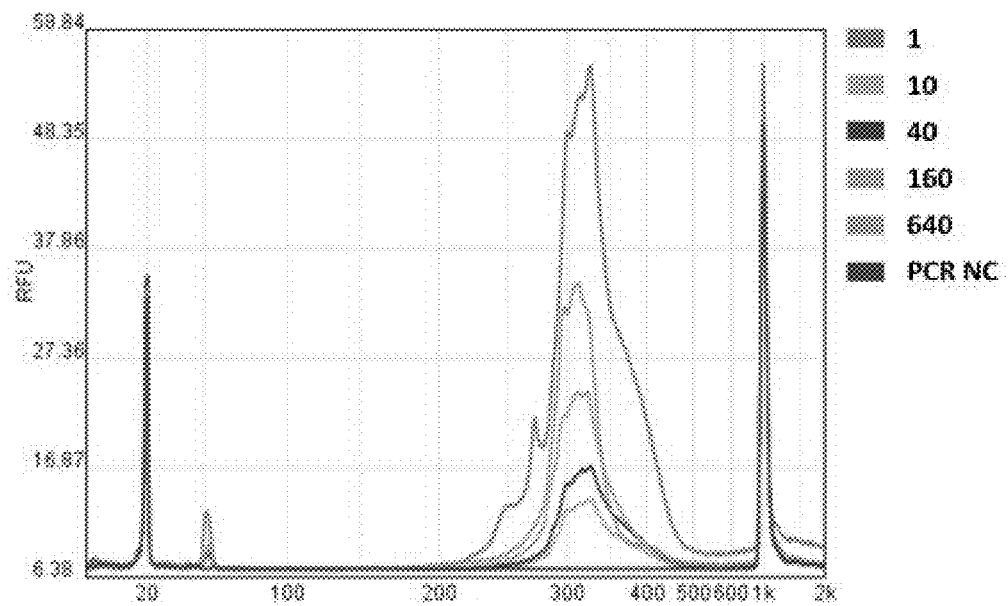
FIG. 9 is a graph illustrating quality detection result of the library according to some embodiments of the present disclosure.

FIG. 9 is a graph illustrating quality detection result of library according to some embodiments of the present disclosure, where PCR NC refers to the PCR blank control. The results indicate that the method can produce high-quality sequencing libraries.

Figure 10:
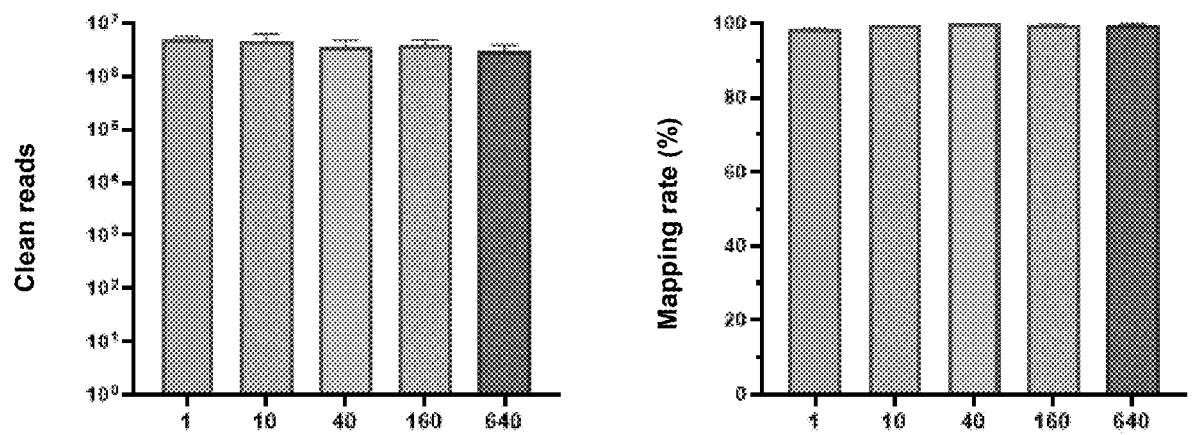
FIG. 10 is a graph illustrating statistical result of sequencing data and alignment rate of samples to be tested with different gradients according to some embodiments of the present disclosure.

As shown in FIG. 10, the analysis results indicate that the amount of clean reads from ssDNA libraries of different gradients (1 fmol, 10 fmol, 40 fmol, 160 fmol, 640 fmol) is similar and stable. Furthermore, when the clean reads are mapped to the genome, mapping rates are also extremely high, with a lowest mapping rate for the 1 fmol group being above 98.5%. The mapping rates for different groups are also very stable.

Example 3. Verification of No Bias of the Liss-Seq Library by High-Throughput Sequencing To further analyze whether there is significant bias in the method, the distribution of the clean reads from Example 2 was analyzed.

Figure 11:
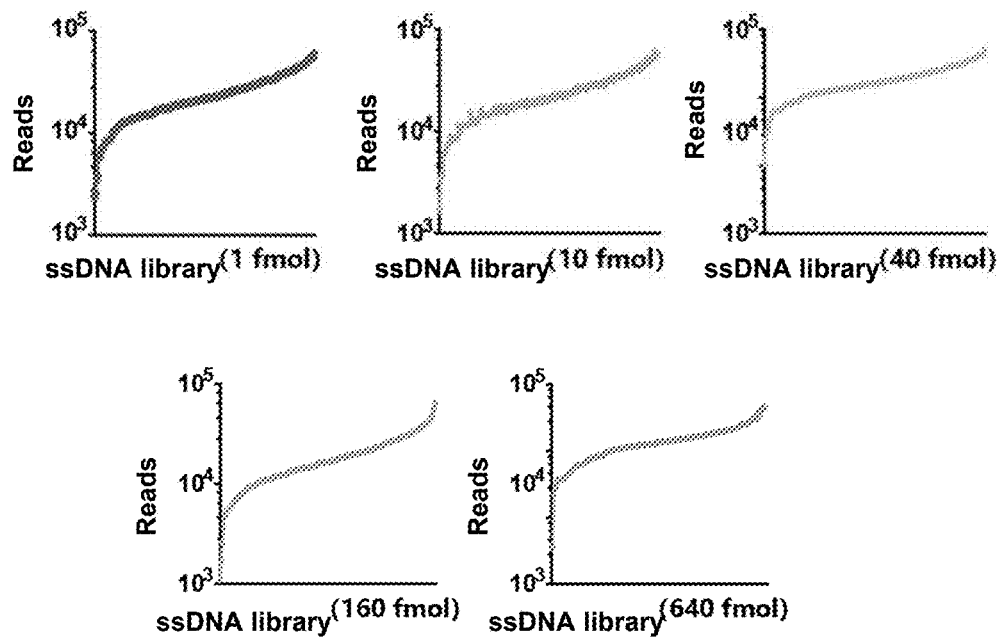
FIG. 11 is a graph illustrating analysis result of reads distribution of samples to be tested with different gradients according to some embodiments of the present disclosure.

FIG. 11 illustrates the reads distribution detected for 200 target ssDNA sequences in sequencing results of different gradients. As shown in FIG. 11, the results indicate that the reads distribution detected in ssDNA libraries of different gradients (1 fmol, 10 fmol, 40 fmol, 160 fmol, 640 fmol) is a similar "S" shaped distribution (the integrated result is shown in the lower right corner). Additionally, corresponding Reads may be measured for each ssDNA sequence. These results indicate that the method has no significant bias, which is stable and has high sensitivity.

Figure 12:
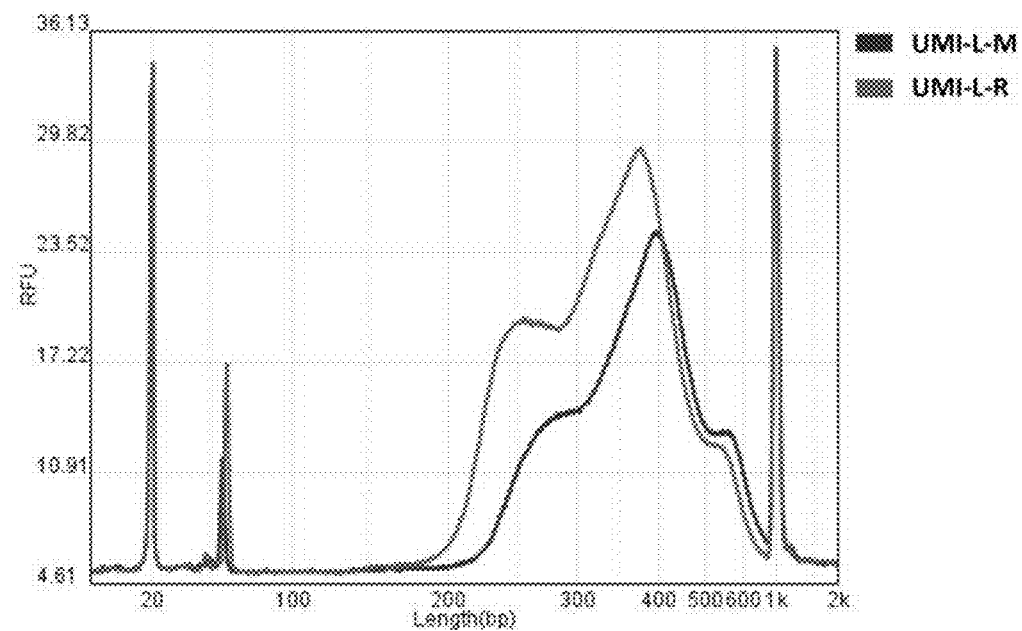
FIG. 12 is a graph illustrating quality detection result of cfDNA sample preparation library according to some embodiments of the present disclosure.

Example 4. Preparation of cfDNA Sample Library for Efficient Application in Cell Culture Medium In order to further analyze the efficiency and specificity of the method in detecting ssDNA in real biological samples, the culture medium of non-small cell lung cancer A549 cells was collected, cfDNA samples were extracted, and library construction was performed following the above process (Steps 1 to 10). Two types of adapters (UMI-L-M and UMI-L-R) were used, and the number of the PCR cycle in step 9 was 18. As shown in FIG. 12, the capillary electrophoresis detection results indicate that the library construction method based on two hairpin adaptors used in the example of the present disclosure can stably produce high-quality libraries.

The basic concepts have been described above, apparently, in detail, as will be described above, and do not constitute limitations of the disclosure. Although there is no clear explanation here, those skilled in the art may make various modifications, improvements, and corrections of the present disclosure. This type of modifications, improvements, and corrections are recommended in the present disclosure, so the modifications, improvements, and the corrections remain in the spirit and scope of the exemplary embodiment of the present disclosure.

At the same time, the present disclosure uses specific words to describe the embodiments of the present disclosure. As "one embodiment", "an embodiment", and/or "some embodiments" means a certain feature, structure, or characteristic of at least one embodiment of the present disclosure. Therefore, it is emphasized and should be appreciated that two or more references to "an embodiment" or "one embodiment" or "an alternative embodiment" in various parts of the present disclosure are not necessarily all referring to the same embodiment. Further, certain features, structures, or features of one or more embodiments of the present disclosure may be combined.

In addition, unless clearly stated in the claims, the order of processing elements and sequences, the use of numbers and letters, or the use of other names in the present disclosure are not used to limit the order of the procedures and methods of the present disclosure. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, the disclosure does not mean that the subject matter of the present disclosure object requires more features than the features mentioned in the claims. Rather, the claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the terms "about", "approximate", or "substantially". Unless otherwise stated, "about", "approximate", or "substantially" may indicate ±20% variation of the value it describes. Accordingly, in some embodiments, the numerical parameters used in the disclosure and claims are approximate values, and the approximation may change according to the characteristics required by the individual embodiments. In some embodiments, the numerical parameter should consider the prescribed effective digits and adopt a general digit retention method. Although in some embodiments, the numerical fields and parameters used to confirm the breadth of its range are approximate values, in specific embodiments, such numerical values are set as accurately as possible within the feasible range.

With respect to each patent, patent application, patent application disclosure, and other material cited in the present disclosure, such as articles, books, manuals, publications, documents, etc., the entire contents thereof are hereby incorporated by reference into the present disclosure. Application history documents that are inconsistent with the contents of the present disclosure or that create conflicts are excluded, as are documents (currently or hereafter appended to the present disclosure) that limit the broadest scope of the claims of the present disclosure. It should be noted that in the event of any inconsistency or conflict between the descriptions, definitions, and/or use of terms in the materials appended to the present disclosure and those described in the present disclosure, the descriptions, definitions, and/or use of terms in the present disclosure shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for preparing a 5'-end ligation-based ssDNA-specific sequencing library, comprising:
    (a) treating a DNA sample to be tested that includes single-stranded DNA and double-stranded DNA with Klenow Fragment DNA polymerase lacking both 3'→5' and 5'→3' exonuclease activity to fill in 5' ends of the double-stranded DNA to obtain a first reaction product, wherein the first reaction product includes double-stranded DNA with blunt ends, double-stranded DNA with 3' overhang, and the single-stranded DNA;
    (b) conducting a 3' end tail addition reaction on the first reaction product to obtain a second reaction product;
    (c) ligating the single-stranded DNA of the second reaction product with a renatured 5' hairpin adaptor to obtain a single-stranded DNA ligation product; wherein a structure of the 5' hairpin adaptor is: 5'-overhang-random base region-first stem region-loop region-second stem region-3', wherein the first stem region and the second stem region form a double-strand through a renaturation treatment; and
    (d) amplifying the ligation product to obtain the 5'-end ligation-based ssDNA-specific sequencing library;
    wherein a length of the 5'-overhang is within a range of 0-20 nt.

2. The method of claim 1, wherein a length of the random base region is within a range of 3-12 nt, a length of the first stem region is within a range of 8-25 nt, a length of the second stem region is within a range of 8-25 nt, and a length of the loop region is within a range of 5-50 nt.

3. The method of claim 1, wherein a length of the random base region is 6 nt, a length of the 5'-overhang is 12 nt, a length of the first stem region is 11 nt, a length of the second stem region is 11 nt, and a length of the loop region is 38 nt.

4. The method of claim 1, wherein a 5' end of the 5' hairpin adaptor is a hydroxyl group.

5. The method of claim 1, wherein a molar ratio of the 5' hairpin adaptor to the second reaction product is not less than 50:1.

6. The method of claim 1, further comprising:
    performing a phosphorylation treatment on the second reaction product before step (c).

7. The method of claim 1, wherein the 5' hairpin adaptor is determined by a process including: annealing the first stem region and the second stem region to form a double-helix structure to form the 5' hairpin adaptor.

8. The method of claim 1, wherein a reagent used for the 3' end tail addition reaction is terminal transferase and dATP, and a molar ratio of the dATP to the first reaction product is more than 100.

9. The method of claim 1, wherein the second reaction product includes the double-stranded DNA with blunt ends having a poly(dA) tail, the double-stranded DNA with 3' overhang having a poly(dA) tail, and the single-stranded DNA having a poly(dA) tail.

10. The method of claim 1, wherein the 5' hairpin adaptor is SEQ ID NO:1.

11. The method of claim 1, wherein the 5' hairpin adaptor includes UMI-L-M or UMI-L-R, and a sequence of the UMI-L-M is SEQ ID NO: 2, and a sequence of the UMI-L-R is shown in SEQ ID NO:3.

12. The method of claim 1, wherein primer sequences used for the amplifying are SEQ ID NO:4, SEQ ID NO:5, SEQ ID NO:6, or SEQ ID NO:7.

* * * * *

SEQUENCE LISTING

```
Sequence total quantity: 7
SEQ ID NO: 1            moltype = DNA  length = 68
FEATURE                 Location/Qualifiers
source                  1..68
                        mol_type = other DNA
                        organism = synthetic construct
SEQUENCE: 1
gagatacccg tgnnnnnnta ggtgcctacg aggagatacg ccgtaaggac gacttgggta   60
ggcaccta                                                            68

SEQ ID NO: 2            moltype = DNA  length = 78
FEATURE                 Location/Qualifiers
source                  1..78
                        mol_type = other DNA
                        organism = synthetic construct
SEQUENCE: 2
gagatacccg tgnnnnnnta ggtgcctacg aggagatacn nnnnnnnnng ccgtaaggac   60
gacttgggta ggcaccta                                                 78

SEQ ID NO: 3            moltype = DNA  length = 78
FEATURE                 Location/Qualifiers
source                  1..78
                        mol_type = other DNA
                        organism = synthetic construct
SEQUENCE: 3
gagatacccg tgnnnnnnta ggtgcctacg aggagatacg ccgtaaggac gacttnnnnn   60
nnnnngggta ggcaccta                                                 78

SEQ ID NO: 4            moltype = DNA  length = 78
FEATURE                 Location/Qualifiers
source                  1..78
                        mol_type = other DNA
                        organism = synthetic construct
SEQUENCE: 4
aatgatacgg cgaccaccga gatctacact ctttccctac acgacgctct tccgatctta   60
ggtgcctacg aggagata                                                 78
```

```
SEQ ID NO: 5           moltype = DNA  length = 89
FEATURE                Location/Qualifiers
source                 1..89
                       mol_type = other DNA
                       organism = synthetic construct
SEQUENCE: 5
caagcagaag acggcatacg agatcgtgat gtgactggag ttcagacgtg tgctcttccg    60
atcttttttt tttttttttt tttttttvn                                     89

SEQ ID NO: 6           moltype = DNA  length = 89
FEATURE                Location/Qualifiers
source                 1..89
                       mol_type = other DNA
                       organism = synthetic construct
SEQUENCE: 6
caagcagaag acggcatacg agatacatcg gtgactggag ttcagacgtg tgctcttccg    60
atcttttttt tttttttttt tttttttvn                                     89

SEQ ID NO: 7           moltype = DNA  length = 89
FEATURE                Location/Qualifiers
source                 1..89
                       mol_type = other DNA
                       organism = synthetic construct
SEQUENCE: 7
caagcagaag acggcatacg agatgcctaa gtgactggag ttcagacgtg tgctcttccg    60
atcttttttt tttttttttt tttttttvn                                     89
```